United States Patent
Dallabora et al.

(10) Patent No.: US 10,956,290 B2
(45) Date of Patent: Mar. 23, 2021

(54) MEMORY MANAGEMENT

(71) Applicant: Micron Technology, Inc., Boise, ID (US)

(72) Inventors: Marco Dallabora, Melegnano (IT); Emanuele Confalonieri, Lesmo (IT); Paolo Amato, Pagazzano (IT); Daniele Balluchi, Cernusco Sul Naviglio (IT); Danilo Caraccio, Buonalbergo (IT)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 16/214,701

(22) Filed: Dec. 10, 2018

(65) Prior Publication Data
US 2019/0108108 A1     Apr. 11, 2019

Related U.S. Application Data

(63) Continuation of application No. 15/345,862, filed on Nov. 8, 2016, now Pat. No. 10,261,876.

(51) Int. Cl.
*G06F 11/20*     (2006.01)
*G06F 3/06*     (2006.01)

(52) U.S. Cl.
CPC .......... *G06F 11/2094* (2013.01); *G06F 3/061* (2013.01); *G06F 3/064* (2013.01);
(Continued)

(58) Field of Classification Search
CPC ............. G06F 11/1004; G06F 11/1008; G06F 11/1068; G06F 3/064; G06F 3/0608; G06F 3/061; G06F 3/0634
See application file for complete search history.

(56) References Cited

U.S. PATENT DOCUMENTS 6,094,693 A     7/2000     Haneda
6,170,066 B1 *     1/2001     See ..................... G06F 11/1441
                                                                                                                         713/340
(Continued)

FOREIGN PATENT DOCUMENTS

CN            104008773 A     8/2014
KR            10-0504401 B1     7/2005
(Continued)

OTHER PUBLICATIONS

Office Action from Taiwanese patent application No. 106129580, dated Jan. 18, 2019, 15 pp.
(Continued)

*Primary Examiner* — Nadeem Iqbal
(74) *Attorney, Agent, or Firm* — Brooks, Cameron & Huebsch, PLLC

(57) ABSTRACT

The present disclosure includes apparatuses and methods related to hybrid memory management. An example apparatus can include a first memory array, a number of second memory arrays, and a controller coupled to the first memory array and the number of second memory arrays configured to execute a write operation, wherein execution of the write operation writes data to the first memory array starting at a location indicated by a write cursor, and place the write cursor at an updated location in the first memory array upon completing execution of the write operation, wherein the updated location is a next available location in the first memory array.

11 Claims, 3 Drawing Sheets

(52) U.S. Cl.
CPC .......... *G06F 3/0604* (2013.01); *G06F 3/0608* (2013.01); *G06F 3/0634* (2013.01); *G06F 3/0647* (2013.01); *G06F 3/0659* (2013.01); *G06F 3/0685* (2013.01); *G06F 3/0688* (2013.01)

(56) References Cited

U.S. PATENT DOCUMENTS

| | | | |
|---|---|---|---|
| 6,363,008 B1 | 3/2002 | Wong | |
| 6,366,510 B2* | 4/2002 | Fibranz | G11C 29/46 365/201 |
| 6,558,967 B1 | 5/2003 | Wong | |
| 6,587,382 B1* | 7/2003 | Estakhri | G06F 3/0604 365/185.11 |
| 7,070,113 B2* | 7/2006 | Shiraishi | G11C 16/3418 235/492 |
| 7,120,729 B2* | 10/2006 | Gonzalez | G06F 12/0246 711/103 |
| 8,356,153 B2 | 1/2013 | Franceschini et al. | |
| 8,443,263 B2 | 5/2013 | Selinger et al. | |
| 9,021,275 B1 | 4/2015 | Greenan et al. | |
| 9,037,782 B2* | 5/2015 | Seng | G06F 12/0246 711/103 |
| 9,122,580 B2 | 9/2015 | Huang et al. | |
| 9,164,832 B2 | 10/2015 | Gaertner et al. | |
| 9,229,860 B2 | 1/2016 | Matsuzawa et al. | |
| 9,262,084 B2 | 2/2016 | Brewer et al. | |
| 9,436,609 B2 | 9/2016 | Eggleston | |
| 9,489,302 B2 | 11/2016 | Van Aken | |
| 9,570,161 B2* | 2/2017 | Liu | G11C 16/10 |
| 9,627,072 B2* | 4/2017 | Chang | G11C 16/10 |
| 9,645,177 B2 | 5/2017 | Cohen et al. | |
| 9,645,917 B2* | 5/2017 | Small | G06F 12/0246 |
| 9,842,059 B2* | 12/2017 | Kamruzzaman | G06F 12/109 |
| 10,261,876 B2* | 4/2019 | Dallabora | G06F 3/0604 |
| 10,430,085 B2* | 10/2019 | Amato | G06F 3/0616 |
| 2004/0065744 A1* | 4/2004 | Shiraishi | G11C 16/3418 235/492 |
| 2004/0128438 A1 | 7/2004 | Regev et al. | |
| 2005/0055495 A1 | 3/2005 | Vihmalo et al. | |
| 2006/0179263 A1 | 8/2006 | Song et al. | |
| 2008/0140918 A1 | 6/2008 | Sutardja | |
| 2009/0055575 A1 | 2/2009 | Hanhimaki et al. | |
| 2009/0259819 A1 | 10/2009 | Chen et al. | |
| 2010/0058127 A1 | 3/2010 | Terao et al. | |
| 2010/0169708 A1 | 7/2010 | Rudelic et al. | |
| 2011/0113306 A1 | 5/2011 | Eggleston et al. | |
| 2011/0167197 A1 | 7/2011 | Leinwander | |
| 2012/0030409 A1 | 2/2012 | Post et al. | |
| 2012/0303868 A1 | 11/2012 | Tucek | |
| 2013/0097366 A1* | 4/2013 | Shim | G06F 12/0246 711/103 |
| 2013/0219105 A1 | 8/2013 | Confalonieri | |
| 2013/0246732 A1* | 9/2013 | Seng | G06F 12/0246 711/203 |
| 2013/0282967 A1 | 10/2013 | Ramanujan | |
| 2014/0129758 A1 | 5/2014 | Okada et al. | |
| 2015/0331793 A1 | 11/2015 | Matsuzawa et al. | |
| 2015/0339188 A1 | 11/2015 | Hu et al. | |
| 2015/0347228 A1 | 12/2015 | Yang et al. | |
| 2016/0307624 A1* | 10/2016 | Liu | G11C 16/22 |
| 2017/0003892 A1 | 1/2017 | Sekido | |
| 2017/0206010 A1 | 7/2017 | Nachimuthu et al. | |
| 2018/0129423 A1 | 5/2018 | Amato et al. | |

FOREIGN PATENT DOCUMENTS

| | | |
|---|---|---|
| KR | 10-1042588 B1 | 6/2011 |
| TW | 201135746 A | 10/2011 |
| TW | 201225100 A | 6/2012 |
| TW | 201235843 A | 9/2012 |
| TW | 201245960 A | 11/2012 |
| TW | 201443904 A | 11/2014 |
| TW | 201502775 A | 1/2015 |
| TW | 201510724 A | 3/2015 |
| WO | 2007070763 A2 | 6/2007 |
| WO | 2012009318 A1 | 1/2012 |
| WO | 2016088234 A1 | 6/2016 |

OTHER PUBLICATIONS

Moinuddin, et al. "Enhancing Lifetime and Security of PCM-Based Main Memory with Start-Gap Wear Leveling" Proceedings of the 42nd Annual IEEE/ACM International Symposium on Microarchitecture, New York, NY, Dec. 2009, 10 pp.

Chul, et al. "A Hybrid Flash File System Based on NOR and NAND Flash Memories for Embedded Devices", In proceedings of the 8th Annual IEEE Transactions on Computers, vol. 57, Issue 7, Jul. 2008, pp. 1002-1008.

Kim, et al. "A PRAM and NAND Flash Hybrid Architecture for High-Performance Embedded Storage Subsystems", In Proceedings of the 8th ACM International Conference on Embedded Software (EMSOFT 2008), ACM, New York, NY, Oct. 2008, pp. 31-39.

International Search Report and Written Opinion from patent application No. PCT/US2017/048806, dated Dec. 5, 2017, 14 pp.

International Search Report and Written Opinion from related patent application No. PCT/US2017/048800, dated Nov. 28, 2017, 14 pp.

Office Action from related Taiwanese patent application No. 106129529, dated May 7, 2018, 18 pp.

Search Report from related European patent application No. 17869668.8, dated Sep. 9, 2019, 4 pages.

Communication pursuant to Article 94(3) EPC from related European patent application No. 17869668.8, dated Oct. 15, 2019, 6 pages.

Notice of Reasons for Rejection from related Korean Application No. 10-2019-7014722, dated Jun. 10, 2020, 16 pages.

Decision of Rejection from related Korean Application No. 10-2019-7014722, dated Dec. 14, 2020, 7 pages.

\* cited by examiner

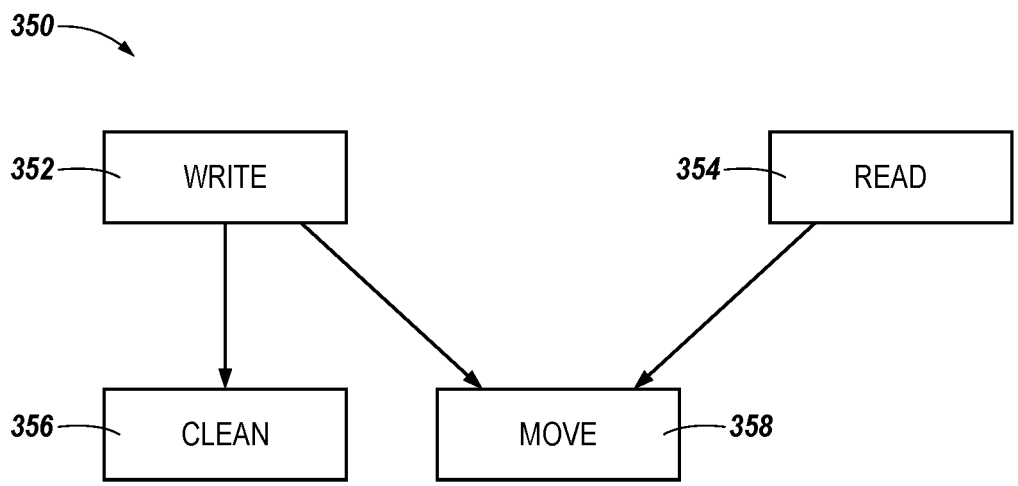
*Fig. 3*
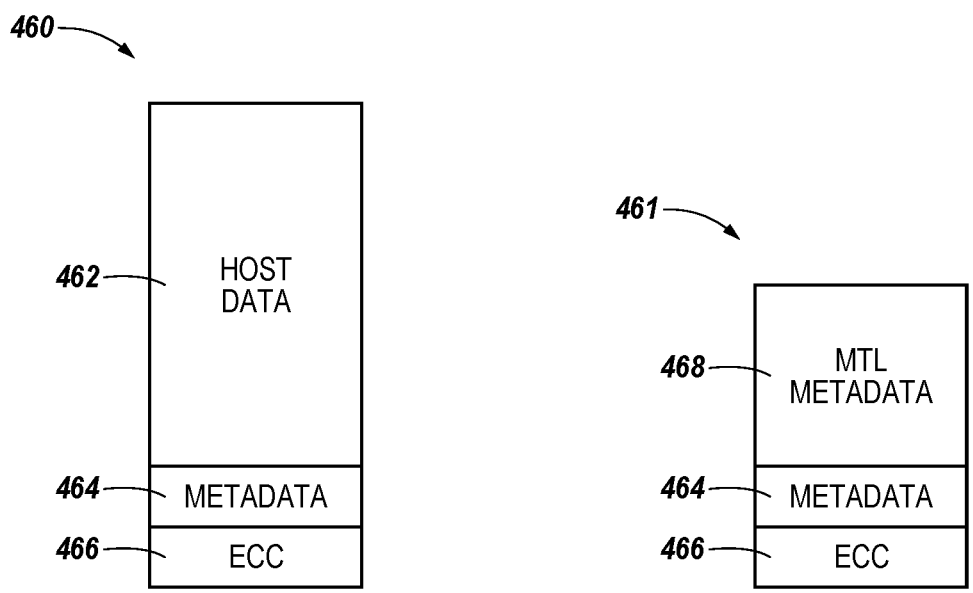
*Fig. 4A*  *Fig. 4B*

MEMORY MANAGEMENT

PRIORITY INFORMATION

This application is a Continuation of U.S. application Ser. No. 15/345,862, filed Nov. 8, 2016, the contents of which are included herein by reference

TECHNICAL FIELD

The present disclosure relates generally to memory devices, and more particularly, to apparatuses and methods for memory management.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 3 is a function diagram illustrating a number of operations performed on a memory device in accordance with a number of embodiments of the present disclosure.

FIGS. 4A and 4B illustrate a first managed unit and a second managed unit in accordance with a number of embodiments of the present disclosure.

DETAILED DESCRIPTION

Figure 1:
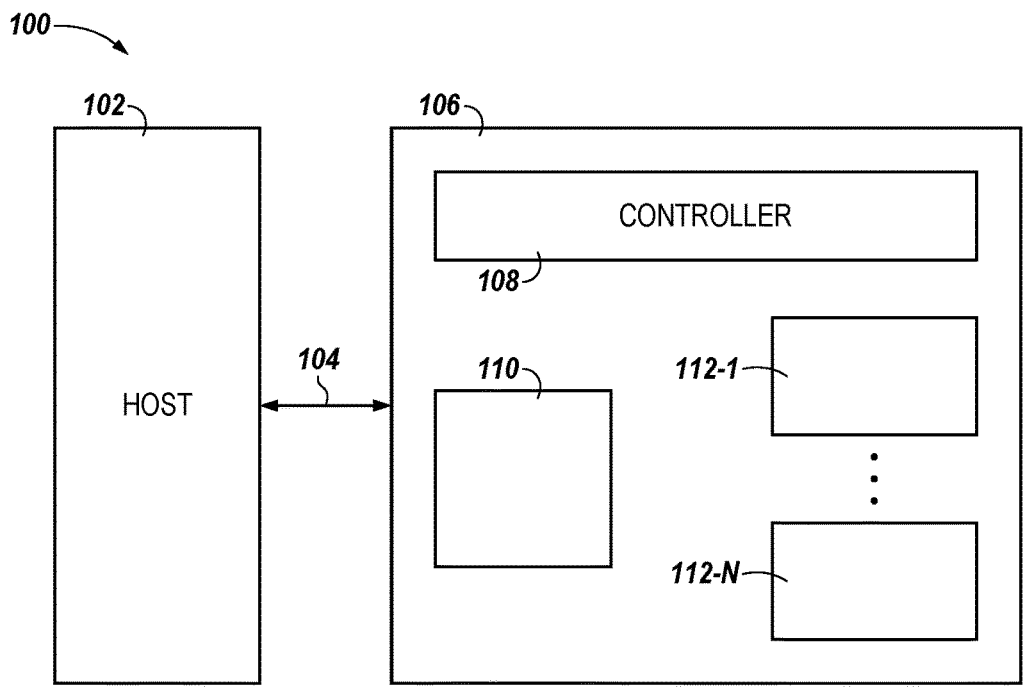
FIG. 1 is a block diagram of an apparatus in the form of a computing system including a memory device in accordance with a number of embodiments of the present disclosure.

The present disclosure includes apparatuses and methods related to hybrid memory management. An example apparatus can include a first memory array, a number of second memory arrays, and a controller coupled to the first memory array and the number of second memory arrays configured to execute a write operation, wherein execution of the write operation writes data to the first memory array starting at a location indicated by a write cursor, and place the write cursor at an updated location in the first memory array upon completing execution of the write operation, wherein the updated location is a next available location in the first memory array.

In a number of embodiments, a write operation can be executed on a memory device that includes a first memory array and a number of second memory arrays. The memory device can be a hybrid memory device, where the first memory array can be a storage class memory and the number of second memory arrays can be a different type of memory, such as NAND Flash memory. The write operation can include writing data to the first memory array and/or the number of second memory array. The data can be written to the first memory array responsive to an amount of data stored in the first memory array being below a threshold amount.

In a number of embodiments, write operations executed on a first memory array can be written based on a write cursor that indicates a location where a write operation will start. The location of the write cursor can be based on the status of a number of managed units in the write array, where each managed unit can have a status of valid, invalid, free, or do not use. The location of the write cursor can be updated and placed at a next managed unit having a free status after each write operation. For example, the managed units can be assigned addresses in a sequential order based on their physical location and the managed units are iterated through in a sequential order based on their address to determine the status of the managed units and place the write cursor at an updated location.

In a number of embodiments, read operations can include determining managed unit pattern disturb levels and a raw bit error rate (RBER) for data in a first memory array. When the managed unit pattern disturb level is above a threshold or the raw bit error rate (RBER) is above a threshold, a move operation can be performed to move the data to a new location in the first memory array. The data can be moved to a new location when the RBER is above a threshold because an error correction (ECC) operation may not be able to correct errors when reading the data from its original location. The data can be moved to a new location when the managed unit pattern disturb level is above a threshold because errors can be more likely to occur when reading data from a location where neighboring managed units have been programmed at least a particular number of times.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "X", "Y", "N", "M", etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a", "an", and "the" can include both singular and plural referents, unless the context clearly dictates otherwise. In addition, "a number of", "at least one", and "one or more" (e.g., a number of memory arrays) can refer to one or more memory arrays, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to". The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram of an apparatus in the form of a computing system 100 including a memory device 106 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. In a number of embodiments, the computing system 100 can include a number of memory devices. In the embodiment illustrated in FIG. 1, memory device 106 can include a first memory type (e.g., a first memory array 110) and a second memory type (e.g., a number of second memory arrays 112-1, . . . , 112-N). The memory device 106 can be a hybrid memory device, where memory device 106 includes the first memory array 110 that is a different type of memory than the number of second memory arrays 112-1, . . . , 112-N. The first memory array 110 can be storage class memory (SCM), which can be a non-volatile memory that acts as main memory for the memory device 106 because it has faster access time than the number of second memory arrays 112-1, . . . , 112-N. The first memory array 110 can be phase change memory (PCM), spin torque transfer (SST) memory, ferroelectric (FRAM), and/or resistive (RRAM), among other types of non-volatile memory. The number of second memory arrays 112-1, . . . , 112-N can act as a data store (e.g., storage memory) for memory device 106 and can be NAND Flash memory, among other types of memory. For example, the number of second memory arrays 112-1, . . . , 112-N can be RAM, ROM, DRAM, SDRAM, PCRAM, RRAM, and flash memory, among others.

As illustrated in FIG. 1, host 102 can be coupled to the memory device 106 via interface 104. Host 104 and memory device 106 can communicate (e.g., send commands and/or data) on interface 104. Host 102 can be a laptop computer, personal computers, digital camera, digital recording and playback device, mobile telephone, PDA, memory card reader, interface hub, among other host systems, and can include a memory access device, e.g., a processor. One of ordinary skill in the art will appreciate that "a processor" can intend one or more processors, such as a parallel processing system, a number of coprocessors, etc.

Memory device 106 includes controller 108 to communicate with host 102 and the first memory array 110 and the number of second memory arrays 112-1, . . . , 112-N. Controller 108 can send commands to performing operations on the first memory array 110 and the number of second memory arrays 112-1, . . . , 112-N. Controller 108 can communicate with the first memory array 110 and the number of second memory arrays 112-1, . . . , 112-N to read, write, move, and/or erase data, among other operations. Controller 108 can control a number of data flow on the memory device 106. For example, the controller 108 can control writing data to the first memory array 110, writing data to the number of second memory arrays 112-1, . . . , 112-N, reading data from the first memory array 110, reading data from the number of second memory arrays 112-1, . . . , 112-N, moving data from the first memory array 110 to the number of second memory arrays 112-1, . . . , 112-N, and moving data from the number of second memory arrays 112-1, . . . , 112-N to the first memory array 110.

Host 102 includes a host controller to communicate with memory device 106. The host controller can send commands to memory device 106 via interface 104. The host controller can communicate with memory device 106 and/or the controller 108 on the memory device 106 to read, write, and erase data, among other operations.

Controller 108 on memory device 106 and/or the host controller on host 102 can include control circuitry (e.g., hardware, firmware, and/or software). In one or more embodiments, controller 108 on memory device 106 and/or the host controller on host 102 can include control circuitry can be an application specific integrated circuit (ASIC) coupled to a printed circuit board including a physical interface. Also, memory device 106 and host 102 can include a buffer of volatile and/or non-volatile memory and a number of registers.

Figure 2:
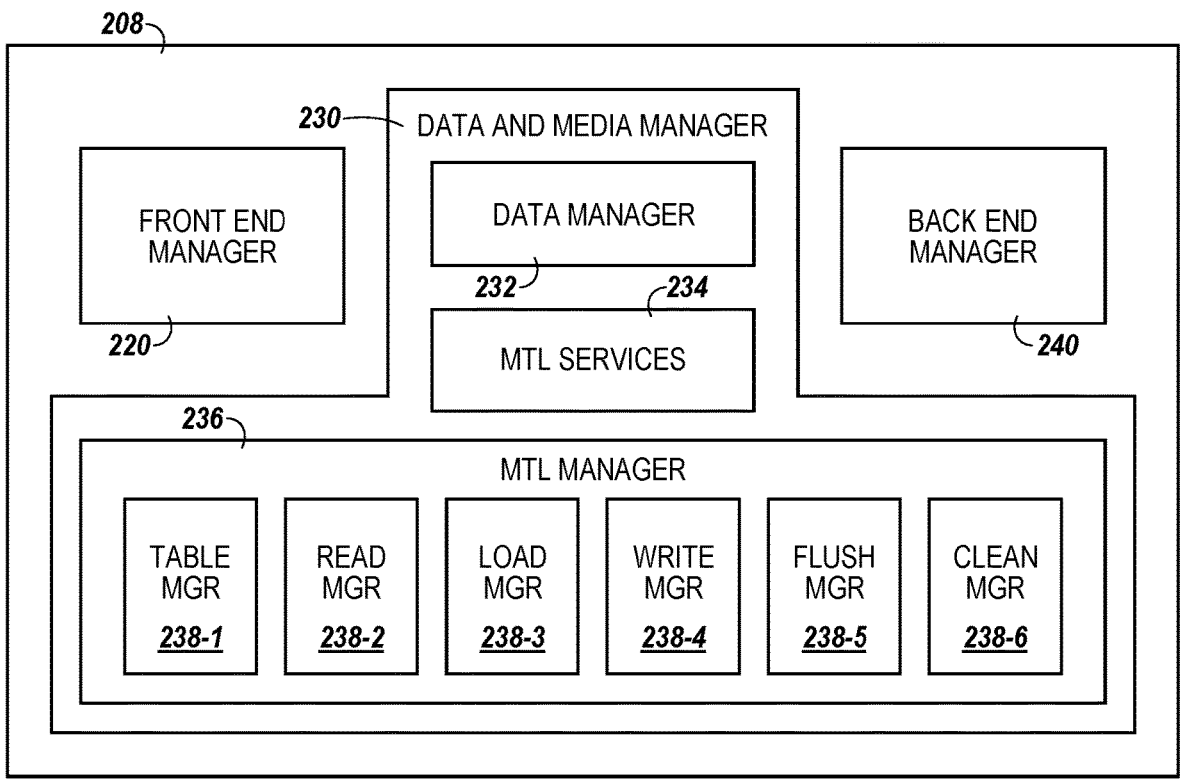
FIG. 2 is a block diagram of a controller in accordance with a number of embodiments of the present disclosure.

FIG. 2 is a block diagram of a controller 208 in accordance with a number of embodiments of the present disclosure. Controller 208 can communicate with a host (e.g., host 102 in FIG. 1) and/or memory arrays (e.g., first memory array 110 and/or the number of second memory arrays 112-1, . . . , 112-N in FIG. 1) to read, write, move, and/or erase data to and/or from the host or memory arrays. Controller 208 includes front end manager 220, data and media manager 230, and back end manager 240.

Front end manager 220 can receive commands from a host and interprets those commands. Front end manager 220 can perform a translation of the logical addresses of data associated with the commands.

Data and media manager 230 can further process commands received from a host. Data and media manager 230 can include data manager scheduler 232, media translation layer (MTL) services 234, and media translation layer (MTL) manager 236. Data manager scheduler 232 can determine when each of the commands received from a host will be performed. MTL services 234 can include a number of sets of application programming interface (API) instructions to provide functionality to the MTL manager 236. MTL services 234 can includes API instructions to perform logical address to physical address translation, read data from memory arrays, and/or write data to memory arrays, among other services.

MTL manager 236 can include table manager 238-1, read manager 238-2, load manager 238-3, write manager 238-4, flush manager 238-5, and clean manager 238-6 to perform operations on the memory arrays.

Table manager 238-1 can provide logical address to physical address mapping for data stored in the memory arrays. The information managed by table manager 238-1 can be stored in the memory arrays. The table manager 238-1 can generate and store a logical to physical table stored the memory arrays to locate data. The logical to physical table can include a bit in the logical address to physical address mapping that indicates whether the data is stored in the first type of memory and/or the second type of memory array. The table manger 238-1 can also generate and store logical to physical pointers to locate data in the memory arrays.

Read manager 238-2 can execute read commands by locating data in the memory arrays and causing the transfer of data associated with the read commands to the host. Read manager 238-2 can also determine whether data read from a second type of memory array should remain in place and/or be moved to a first type of memory array in the memory device. If the read manager 238-2 determines that data should be moved from a first type of memory array to a second type of memory array, the read manager 238-2 notifies the load manager 238-3 to perform this operation.

Load manager 238-4 can execute moving data from a second type of memory array (e.g., NAND) to a first type of memory array (e.g., SCM). Load manager 238-4 can move the data to the first type of memory array and invalidate the original version of the data in the second type of memory array.

Write manager 238-4 can execute write commands by routing data associated with write commands to the first type of memory arrays and/or the second type of memory arrays. Write manager 238-4 can determine whether to write data to the first type of memory array, the second type of memory array, or both based on a number of criteria. The number of criteria can include the size of the data that is being written, the amount of available space in the memory arrays, and/or the frequency that data is being written to the memory arrays, among other criteria.

Flush manager 238-5 can execute moving data from a first type of memory array (e.g., SCM) to a second type of memory array (e.g., NAND). Flush manager 238-5 can move data based on a number of criteria. The criteria can be that the first type of memory array has reached a capacity threshold, for example. The flush manager 238-5 can move data to the second type of memory array and invalidate the original version of the data in the first type of memory array.

Clean manager 238-6 can execute moving data from a first location in the first type of memory array (e.g., SCM) to a second location in the first type of memory array. Clean manager 238-6 can move data as a wear leveling operation so that particular physical locations in the first type of memory array are not written more often than other physical locations. Clean manager 238-6 can execute writing each bit of a managed unit to a particular logical state on each managed unit that has an invalid status. In a number of embodiments, clean manager 238-6 can include programming each bit of a managed unit to a logical state that uses more power and/or has a higher latency than another logical state, so that when a foreground operation (e.g. a write operation, for example) is being executed the foreground operation does not have to program memory cells to the logical state that use more power and/or has a higher latency than another logical state.

FIG. 3 is a function diagram illustrating a number of operations 350 performed on a memory device in accordance with a number of embodiments of the present disclosure. Write operation 352 can be executed on a memory device and can include writing data to a first memory array and/or a number of second memory arrays on a memory device. Write operation 352 can include writing data to the first memory array based on amount of available free space on the first memory array. If there is enough available free space on the first memory array, write operation writes the data to the first memory array and the number of second memory arrays. If there is not enough available free space on the first memory array, write operation 352 writes the data to only the number of second memory arrays.

In a number of embodiments, write operation 352 can include writing data based on a location of a write cursor. The write cursor can indicate where a write operation will start. The write cursor can be updated after each write operation to a new location in a memory array where the next free managed unit is located. Write operation 352 can be a foreground operation, where foreground operations are performed upon receiving a request from a host. Write operation 352 can be a background operation that is initiated by the data manager, such as the load manager 238-3 and/or flush manager 238-5 in FIG. 2, for example.

Clean operation 356 can be executed on a memory device and can include writing each bit of a managed unit to a particular logical state. Clean operation 356 can be performed on each managed unit that has an invalid status. Clean operation 356 can be a background operation, where background operations are performed while no other operations, such as foreground operations, are being performed. For example, a back ground operation can be performed on a particular area of a memory device while no other operations, such as foreground operations, are being performed at the particular area (e.g., a block, a partition, memory device, etc.) where the background operation is being performed. Another operation, such as foreground operations, can be performed at an area (e.g., another block, another partition, and/or another device) other than the particular area where the background operation is being performed while the background operation is being performed. Foreground operations can have priority over background operations so that background problems do not decrease performance or latency of a memory device when a host requests that a memory device perform an operation. In a number of embodiments, clean operation 356 can include programming each bit of a managed unit to a logical state that uses more power and/or has a higher latency than another logical state. Since clean operation 356 can be a background operation, programming the memory cells to a logical state that uses more power and/or has a higher latency than another logical state does not affect the performance of the memory device from a host's perspective. After clean operation 356, the status of a managed unit that has been cleaned can be free. The cleaned managed unit can be then be programmed by only programming the memory cells that need to be changed from the particular logical state that the memory cells were programmed to during clean operation 356. For example, if clean operation 356 programs each bit of a managed unit to logical state 0, then a write operation only needs to program the memory cells that are desired to be at logical state 1. If clean operation 356 programs each bit of a managed unit to logical state 1, then a write operation only needs to program the memory cells that are desired to be at logical state 0.

Read operation 354 can be executed on a memory device and can include determining a managed unit pattern disturb level and/or a raw bit error rate (RBER) for the data. Read operation 354 can also include setting read signal thresholds based on the type of memory array and the type of memory cells in the memory array, such as memory cells programmed to include 2, 3, or 4 bits for example. The managed unit pattern disturb level can be associated with how many times that a managed unit has been disturbed by a neighboring managed unit being programmed. Once the managed unit pattern disturb level has reached a threshold, a move operation 358 can be implemented to move the data to a new location in a memory array. Move operation 358 can also be implemented when the RBER for a memory unit is above a threshold (e.g., there are more errors than can be corrected by an error correction (ECC) operation). Read operation 354 can include outputting data from the memory device to the host when the RBER and the managed unit pattern disturb level are below their respective thresholds. Move operation 358 can also be implemented to move data to a new location when a write operation has been performed on a neighboring managed unit at least a threshold number of times. Move operation 358 can be a background operation, where background operations are performed while no other operations, such as foreground operations, are being performed on the particular area where the background operation is being performed.

FIGS. 4A and 4B illustrate a first managed unit and a second managed unit in accordance with a number of embodiments of the present disclosure. FIG. 4A illustrates a first managed unit 460 (e.g., large managed unit) that includes host data 462, metadata 464, and error correction (ECC) data 466. First managed unit 460 includes host data 462 that has a logical correlation to data received from a host. FIG. 4B illustrates a second managed unit 461 (e.g., small managed unit) that includes MTL metadata 462, metadata 464, and error correction (ECC) data 466. MTL metadata 462 can include logical to physical tables for the data stored in the memory device (e.g., host data 462).

A managed unit is a particular amount of data stored in a group of memory cells in an array that is managed together during operations. The size of a managed unit can vary based on the type of data stored in the managed unit and/or the type of operation performed on the managed unit. For example, a first managed unit 460 (e.g., large managed unit) can include 4 KB of data and can store data from a host, while a second managed unit 461 (e.g., small managed unit) can include 64B of data and can store a logical to physical table associated with the data in the first managed unit. Each managed unit can have a status associated therewith. For example, each managed unit can have a status of valid, invalid, free, or do not use. A valid managed unit includes the most recent version data. An invalid managed unit includes data that is not the most recent version of the data. A "do not use" managed unit is not used to store data for a particular reason, such as the managed unit is no longer able to reliably store data. A free managed unit includes memory cells that are in a reset state and are ready to be programmed (e.g., written to). For example, a reset state can be where all memory cells of managed unit are programmed to a particular logical state (e.g., logical state 0 or logical state 1, for example)

Figure 5A:
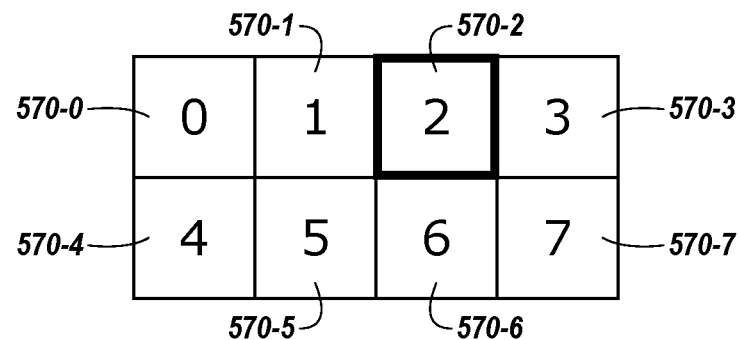
FIGS. 5A and 5B illustrate a number of managed units in accordance with a number of embodiments of the present disclosure.
Figure 5B:
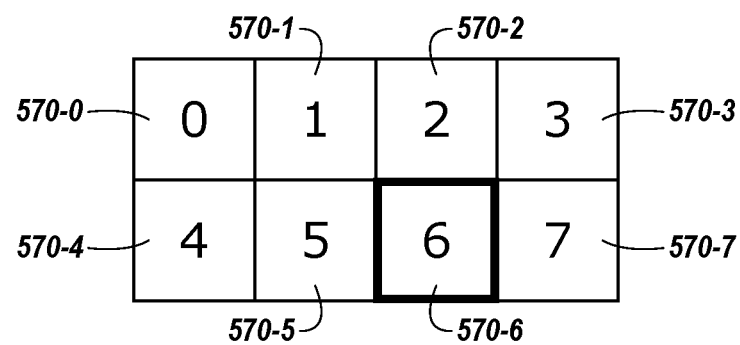

FIGS. 5A and 5B illustrate a number of managed units in accordance with a number of embodiments of the present disclosure. In FIGS. 5A and 5B, the memory array includes managed units 570-0, . . . , 570-7, such as the managed units described in association with FIGS. 4A and 4B, for example. In FIG. 5A, managed units 570-0 and 570-1 have a valid status and a write cursor (indicated by the bold outline) is located at managed unit 570-2 as managed unit 570-2 is first available free managed unit. A write operation can be performed by writing data to the memory array starting at managed unit 570-2, due to the write cursor being located at managed unit 570-2. The write operation can write data to managed units 570-2 and 570-3. For example, the operation can write data to managed units successively that are available free managed units. FIG. 5B illustrates the updated location of the write cursor at managed unit 570-6 after completing the write operation described above in association with FIG. 5A. When placing the write cursor at the updated location of managed unit 570-6, managed unit 570-4 is skipped because it has a valid status and managed unit 570-5 is skipped because it has a do not use status. Therefore, the updated location of the write cursor is at managed unit 570-6 because managed unit 570-6 is the next available managed unit after managed unit 570-3, which is where the last write operation ended.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a first memory array;
   a number of second memory arrays; and
   a controller coupled to the first memory array and to the number of second memory arrays and configured to:
      perform a clean operation on a number of managed units that were in an invalid state in the first memory array by changing the number of managed units from an invalid state to a free state by writing each bit of the number of managed units to a particular logic state, wherein:
      the clean operation includes programming each memory cell in the number of managed units to logic state 0 or logic state 1 to place the number of managed units to the free state; and
      the controller is configured to write data to the number of managed units by only programming those memory cells that are transitioned from the programmed logic state 0 or 1 to the other of the logic state 0 or 1.

2. The apparatus of claim 1, wherein the clean operation is a background operation that is performed by the apparatus when the apparatus is not performing foreground operations on a particular area where the clean operation is being performed.

3. The apparatus of claim 1, wherein the first memory array comprises a storage class memory.

4. The apparatus of claim 1, wherein the number of second memory arrays comprise a memory type different from the first memory array.

5. An apparatus comprising;
a first memory array;
a number of second memory arrays; and
a controller including a clean manager, wherein the clean manager is configured to:
cause data to move from a first location in the first memory array to a second location in the first memory array and to have particular memory locations within the second memory locations written to with a particular frequency that is the same or less than the particular frequency of first memory locations; and perform a clean operation that includes programming each memory cell in the first memory array to logic state 0 or logic state 1; and
wherein after the clean operation, the controller is configured to write data to the first memory array by only programming those memory cells that are transitioned from the logic state 0 or 1 to the other of the logic state 0 or 1.

6. The apparatus of claim 5, wherein the clean manager performs a clean operation and operates in a particular area of the first memory array as a background operation where no other operations are being performed at the particular area.

7. The apparatus of claim 6, wherein another operation is performed in an area other than the particular area where the background operation is being performed.

8. The apparatus of claim 7, wherein the another operation has priority over the background operation.

9. A system comprising;
a host;
a memory device comprising a first memory array and a number of second memory arrays;
a controller coupled to the host and the memory device; and
a clean manager on the controller and configured to communicate with the host and first memory array and the number of second memory arrays to perform a clean operation on a number of managed units that were in an invalid state in the first memory array by changing the number of managed units from an invalid state to a free state by writing each bit of the number of managed units to a particular logic state, wherein:
the clean operation includes programming each memory cell in the number of invalid managed units to logic state 0 or logic state 1 to place the number of managed units to the free state; and
the controller is configured to write data to the number of managed units in the free state by only programming those memory cells that are transitioned from the programmed logic state 0 or 1 to the other of the logic state 0 or 1.

10. The system of claim 9, wherein the clean operation is a background operation that is performed by the apparatus when the apparatus is not performing foreground operations on a particular area where the clean operation is being performed.

11. The system of claim 9, wherein the clean operation is performed without knowledge by the host.

* * * * *